(12) United States Patent
Watson et al.

(10) Patent No.: US 11,379,574 B2
(45) Date of Patent: Jul. 5, 2022

(54) SECURE RECOGNITION OF MOBILE DEVICES

(71) Applicant: Disney Enterprises, Inc., Burbank, CA (US)

(72) Inventors: Scott F. Watson, Marina del Rey, CA (US); Steven C. Eaton, Winter Garden, FL (US); Harout Jarchafjian, Glendale, CA (US); Thomas C. Arthur, Magnolia, TX (US); Vinay Moharil, Orlando, FL (US); Joshua B. Gorin, La Crescenta, CA (US); Adam S. Parish, Windermere, FL (US); Ajay M. Prasad, Lake Mary, FL (US); Joshua Caleb Umstead, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 186 days.

(21) Appl. No.: 16/733,010

(22) Filed: Jan. 2, 2020

(65) Prior Publication Data
US 2021/0209218 A1    Jul. 8, 2021

(51) Int. Cl.
| G06F 21/44 | (2013.01) |
| H04L 9/08 | (2006.01) |
| H04L 67/53 | (2022.01) |
| H04L 67/12 | (2022.01) |
| H04W 4/80 | (2018.01) |

(52) U.S. Cl.
CPC ............. *G06F 21/44* (2013.01); *H04L 9/088* (2013.01); *H04L 67/12* (2013.01); *H04L 67/20* (2013.01); *H04W 4/80* (2018.02)

(58) Field of Classification Search
CPC ........ H04W 4/80; H04W 12/06; H04W 12/08
See application file for complete search history.

(56) References Cited

U.S. PATENT DOCUMENTS

| 9,600,726 | B2 | | 3/2017 | Kirkby et al. | |
| 9,848,075 | B1 | * | 12/2017 | Ahmad | ................ H04W 84/18 |
| 10,505,907 | B2 | | 12/2019 | Jarchafjian et al. | |
| 2004/0235420 | A1 | | 11/2004 | Miyazaki | |
| 2014/0105396 | A1 | | 4/2014 | Engelien-Lopes | |
| 2015/0121501 | A1 | * | 4/2015 | Khalid | ................ H04L 63/0853 |
| | | | | | 726/8 |
| 2015/0271676 | A1 | * | 9/2015 | Shin | ...................... H04W 12/08 |
| | | | | | 713/168 |
| 2015/0302500 | A1 | | 10/2015 | Koch et al. | |
| 2017/0061410 | A1 | * | 3/2017 | Dutta | ..................... H04W 12/06 |
| 2017/0099288 | A1 | * | 4/2017 | Kojima | ............... H04W 12/065 |
| 2018/0091538 | A1 | * | 3/2018 | Narayanan | .......... H04W 12/068 |

(Continued)

*Primary Examiner* — Wen W Huang
(74) *Attorney, Agent, or Firm* — Patterson + Sheridan, LLP

(57) ABSTRACT

Techniques for secure mobile device recognition are disclosed. An IOT edge device determines, based on a network message received at the IOT edge device, that a mobile device is not recognized. The IOT edge device transmits a token request to the mobile device. In response, the IOT edge device receives an encrypted token from the mobile device. The IOT edge device transmits the encrypted token to a server. The server is configured to determine an identifier corresponding with the mobile device, based on the encrypted token. A recognition task is initiated for the mobile device, based on the determined identifier.

17 Claims, 8 Drawing Sheets

(56) References Cited

U.S. PATENT DOCUMENTS

| | | |
|---|---|---|
| 2018/0288068 A1 | 10/2018 | Poliashenko |
| 2018/0302222 A1* | 10/2018 | Agrawal ............... H04L 9/0637 |
| 2018/0324152 A1 | 11/2018 | Jarchafjian et al. |
| 2020/0100108 A1* | 3/2020 | Everson ................ H04L 9/0894 |
| 2021/0099300 A1* | 4/2021 | Kurian .................. H04W 12/08 |

* cited by examiner

SECURE RECOGNITION OF MOBILE DEVICES

BACKGROUND

Field of the Invention

Embodiments presented herein generally relate to techniques for secure permission-based recognition of a mobile device while protecting an identity of a user of the mobile device. More specifically, embodiments presented herein relate to techniques that allow a mobile device to be securely recognized by a trusted third-party while preventing a non-trusted third-party from recognizing the mobile device.

Description of the Related Art

A variety of technologies can be used to recognize a mobile device using signals emitted from the device. These signals emitted by the device can include identifying data, such as a user ID, device ID and an address, that can be used to recognize the device. Some of these technologies, however, may allow an undesired non-trusted third-party to recognize the device if the non-trusted third party can receive and understand the transmitted data. For example, a mobile application may use a static encryption key that is common across all instances of the mobile application to encrypt a transmitted device ID. In that case, the device ID of each mobile device running the mobile application is encrypted using the same encryption key. While this technique may initially be secure, a non-trusted third-party could decompile the application to determine the encryption key. The third-party could then use the encryption key to decrypt any device ID related to that mobile application and recognize the mobile device or a user of the mobile device even though third-party recognition was not intended by the application or the user.

Secure recognition is even more difficult using modern wireless protocols. For example, smartphones functioning as Bluetooth® Low Energy (BLE) peripherals broadcast advertisement messages that contain an address of the smartphone. However, the address of the smartphone is not useful for identification except to a receiving BLE station that has previously bonded with that smartphone. This is because bonding between the peripheral and the BLE station creates a persistent security relationship that enables encrypted communication between the station and the smartphone. Further, when a BLE station first attempts to bond with the smartphone, a prompt is displayed to the user who must approve or reject the bonding. This prompt could confuse or otherwise disrupt a user experience, and is not desirable for many applications. BLE packet size constraints, and other limitations, also make existing encryption techniques particularly challenging. Further, as discussed below, BLE is merely one example of a wireless protocol with these challenges. A variety of suitable wireless protocols have analogous challenges.

SUMMARY

Embodiments disclosed herein include a method for secure mobile device recognition. The method includes determining, based on a network message received at a first IOT edge device, that a mobile device is not recognized at the first IOT edge device. The method further includes transmitting a token request from the first IOT edge device to the mobile device, and in response receiving at the first IOT edge device a first encrypted token from the mobile device. The method further includes transmitting the first encrypted token from the first IOT edge device to a server. The server is configured to determine an identifier corresponding with the mobile device, based on the first encrypted token. The method further includes initiating a recognition task for the mobile device, based on the determined identifier.

Embodiments disclosed herein further include a non-transitory computer-readable medium containing computer program code that, when executed by operation of one or more computer processors, performs an operation. The operation includes determining, based on a network message received at a first IOT edge device, that a mobile device is not recognized at the first IOT edge device. The operation further includes transmitting a token request from the first IOT edge device to the mobile device, and in response receiving at the first IOT edge device a first encrypted token from the mobile device. The operation further includes transmitting the first encrypted token from the first IOT edge device to a server. The server is configured to determine an identifier corresponding with the mobile device, based on the first encrypted token. The operation further includes initiating a recognition task for the mobile device, based on the determined identifier.

Embodiments disclosed herein further include a system. The system includes a processor and a memory containing a program that, when executed on the processor, performs an operation. The operation includes determining, based on a network message received at a first IOT edge device, that a mobile device is not recognized at the first IOT edge device. The operation further includes transmitting a token request from the first IOT edge device to the mobile device, and in response receiving at the first IOT edge device a first encrypted token from the mobile device. The operation further includes transmitting the first encrypted token from the first IOT edge device to a server. The server is configured to determine an identifier corresponding with the mobile device, based on the first encrypted token. The operation further includes initiating a recognition task for the mobile device, based on the determined identifier.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments presented herein generally describe techniques for recognizing a mobile device by a trusted party, with permission, while preventing non-trusted third-parties from recognizing that mobile device. Recognizing a mobile device can be used for a variety of applications. For example, a sports arena operator could use an identity and a location of a mobile device to link a photograph with a user, provide custom audio for an arena attraction, and improve the user experience. Advantageously, embodiments presented herein allow a user to explicitly give permission to a trusted party to recognize a mobile device of the user for delivery of value-added services, while ensuring that other non-trusted third-parties do not recognize that device.

In one embodiment, a first party recognizes a mobile device using a wireless protocol, such as Bluetooth® Low Energy (BLE), while preventing third-parties from also recognizing the mobile device through eavesdropping on messages exchanged using the wireless protocol. BLE is wireless protocol, well known to people of ordinary skill in the art. As discussed herein, BLE is merely one example of a suitable communication protocol. One of ordinary skill would recognize that any suitable wireless protocol, including a proprietary protocol or another protocol in the same spectrum as BLE (e.g., ShockBurst™), could be used (e.g., Wi-Fi, a cellular protocol, or any other suitable protocol). Bluetooth® is a registered trademark of the Bluetooth Special Interest Group.

In an embodiment, an unchanging value advertised by the mobile device, or readable on the guest device, could pose a security risk. For example, a non-trusted party could use the unchanging value to track the device. Similarly, a private key (e.g., a private encryption key) included in an application on the mobile device could become compromised, and may therefore not be secure. This means that a symmetric encryption scheme in which multiple mobile devices share a private key may not be sufficiently secure.

One or more techniques disclosed herein can address these problems. For example, in an embodiment, a mobile device can use a private, rotating, identifier token that is issued by a trusted party. The token can be embedded in the device and can be used to securely identify the device to the trusted party that issued the token. The token can obfuscate any identifiers correlated with the mobile device, to prevent non-trusted third parties from persistent identification of users. Further, the token can be generated to meet bit size constraints (e.g., to allow transmission as a BLE characteristic). Because the token is generated, and validated, by a trusted party, it cannot be compromised through the mobile application and the recognition of the mobile device by the trusted party is secure.

Figure 1:
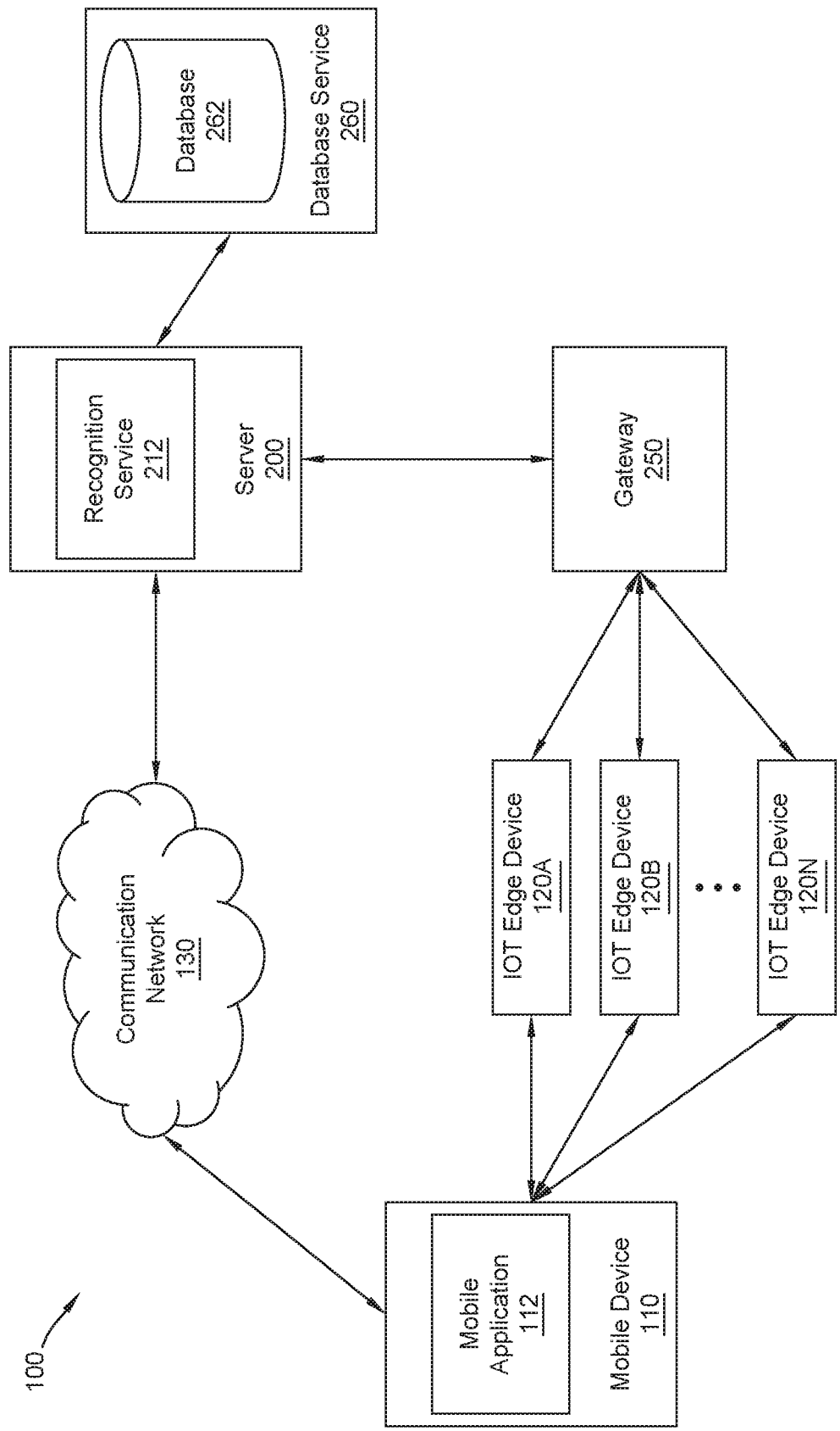
FIG. 1 illustrates a computing environment for secure recognition of mobile devices, according to one embodiment.

FIG. 1 illustrates a computing environment 100 for secure recognition of mobile devices, according to one embodiment. As shown, the computing environment 100 includes a mobile device 110, one or more Internet of Things (IOT) edge devices 120A-N (e.g., BLE readers), a gateway 250, a server computer 200, and a database service 260, all of which communicate over a communication network 130.

As shown, mobile device 110 can be any suitable mobile device (e.g., a smartphone, tablet, smart watch or other wearable device, etc.). The mobile device 110 includes a mobile application 112. Once the mobile application 112 is used to create and log into a user account, the mobile application 112 obtains a set of tokens relating to a user of the mobile device 110. The set of tokens is stored on the mobile device 110, as part of the mobile application 112. In an embodiment, as discussed further below in relation to FIG. 6, the tokens are generated by the server 200.

As shown, the database service 260 includes a database 262. In an embodiment, the database 262 can be any suitable database (e.g., a relational database, a graph database, etc.). The database service 260 can map between an identifier for a user and the tokens generated for the user. The server 200 includes a recognition service 212, which can use the mapping provided by the database service 260 to recognize a user identifier based on a token.

In other words, the user identifier associated with a given mobile device 110 can be obtained based on a token generated by the server 200 and provided to the mobile device 110. For example, upon receiving a request to resolve a token, the recognition service 212 on the server 200 uses the mapping in the database service 260 to identify the user identifier corresponding with the token. As illustrated in FIG. 1, the database service 260 is separate from the recognition service 212. Alternatively, the database service 260 and the recognition service 212 could be combined and could run on a combined service platform (e.g., the server 200).

The IOT edge devices 120A-N listen for messages from a peripheral device, such as mobile device 110. For example, mobile application 112 broadcasts a message using a wireless protocol (e.g., a BLE advertisement). The advertisement includes an address (e.g., a MAC address). In an embodiment, this address may change over time. When an IOT edge device 120A-N detects a message, that IOT edge device temporality stores the address and signal strength of the message as well as a current time.

In an embodiment, each IOT edge device 120A-N is associated with a particular physical location in the environment. For example, the IOT edge device 120A can be associated with a particular concession stand, while the IOT edge device 120B can be associated with a portion of arena seating. By recognizing when the mobile device 110 is in range of a given IOT edge device 120A-N, devices in the environment 100 can recognize the approximate physical location of the mobile device 110.

In an embodiment, the gateway 250 acts as an interface between the IOT edge devices 120A-N and the server 200. For example, the IOT edge devices 120A-N can transmit a recognition message to the gateway 250 after identifying the mobile device 110. The gateway 250 can then communicate with the server 200 (e.g., forwarding the recognition message). In an embodiment, the gateway 250 and server 200 can be combined and the IOT edge devices 120A-N can communicate with the server 200. In another embodiment, the IOT edge devices 120A-N can sometimes use the gateway 250 as an interface to the server 200, and can sometimes communicate directly with the server 200.

In an embodiment, the gateway 250 communicates with the server 200 using the communication network 130, the server 200 communicates with the database service 260 using the communication network 130, and the IOT edge devices 120A-N communicate with the gateway 250 using the communication network 130. The communication network 130 can be any suitable communication network (e.g., the internet, a local area network (LAN), a wide area network (WAN), etc.). Further, the communication network 130 can be made up of multiple communication networks. For example, the mobile device 110 can communicate with the server 200 using a public network (e.g., the internet), while the gateway 250 can communicate with the server 200 using a private network (e.g., a LAN or a private WAN) or a combination of a private and public network.

Figure 2:
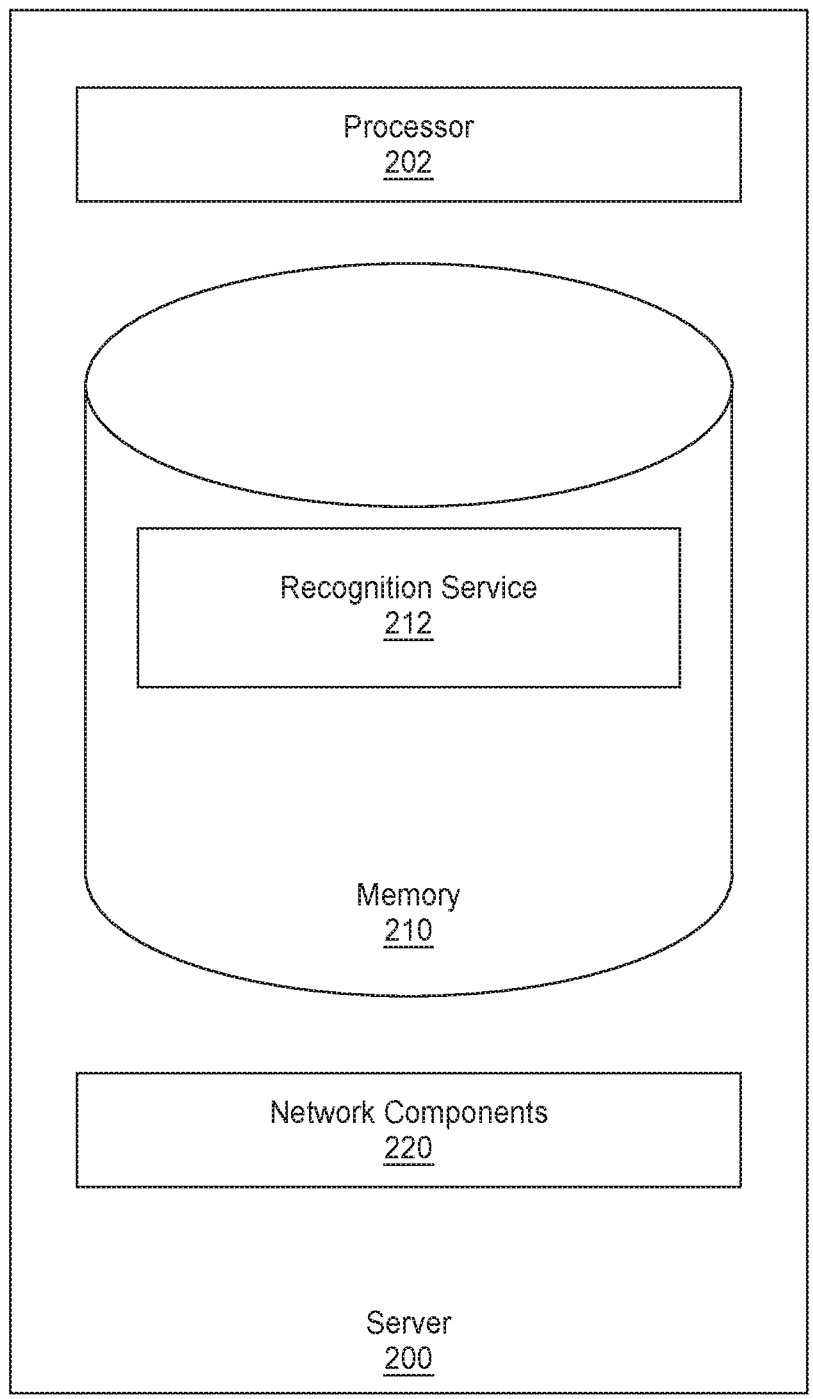
FIG. 2 illustrates a server with a recognition service for secure recognition of mobile devices, according to one embodiment.

FIG. 2 illustrates a server 200 with a recognition service 212 for secure recognition of mobile devices, according to one embodiment. The server 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like. Further, the server 200 can be a single server computer, or can represent a collection of server computers (e.g., managed together).

The network components 220 include the components necessary for the server 200 to interface with a wireless or wired communication network (e.g., the communication network 130 illustrated in FIG. 1). For example, the network components 220 can include WiFi or cellular network interface components and associated software, or wired network interface components (e.g., Ethernet components, fiber optic components, etc.).

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the server 200. The program code is generally described as various functional "applications" or "modules" within the memory 210, although alternate implementations may have different functions and/or combinations of functions. Within the memory 210, the recognition service 212 manages secure recognition of mobile devices, as discussed further in relation to the subsequent figures.

Figure 3A:
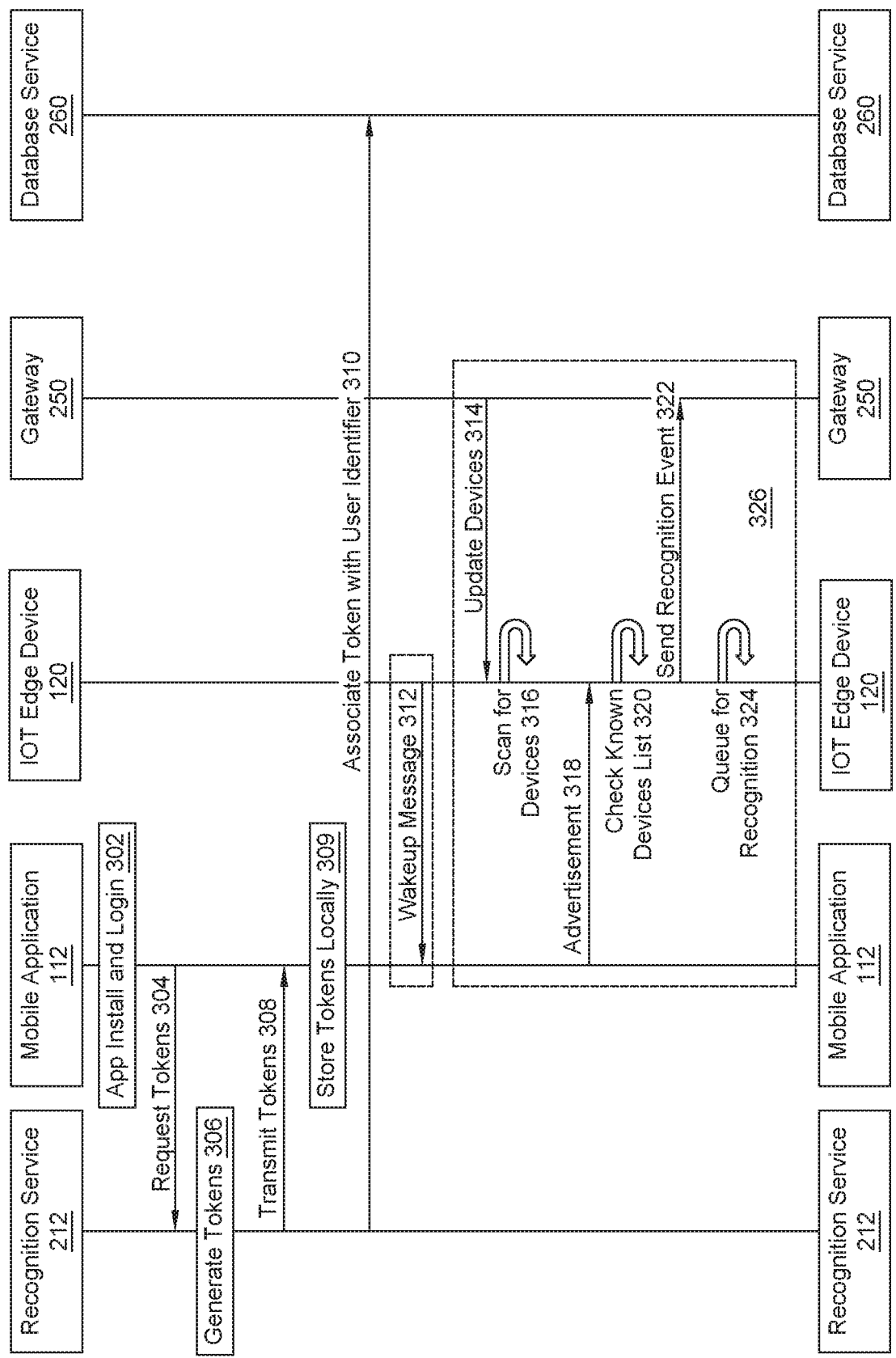
FIGS. 3A-B are process diagrams illustrating secure recognition of mobile devices, according to one embodiment.
Figure 3B:
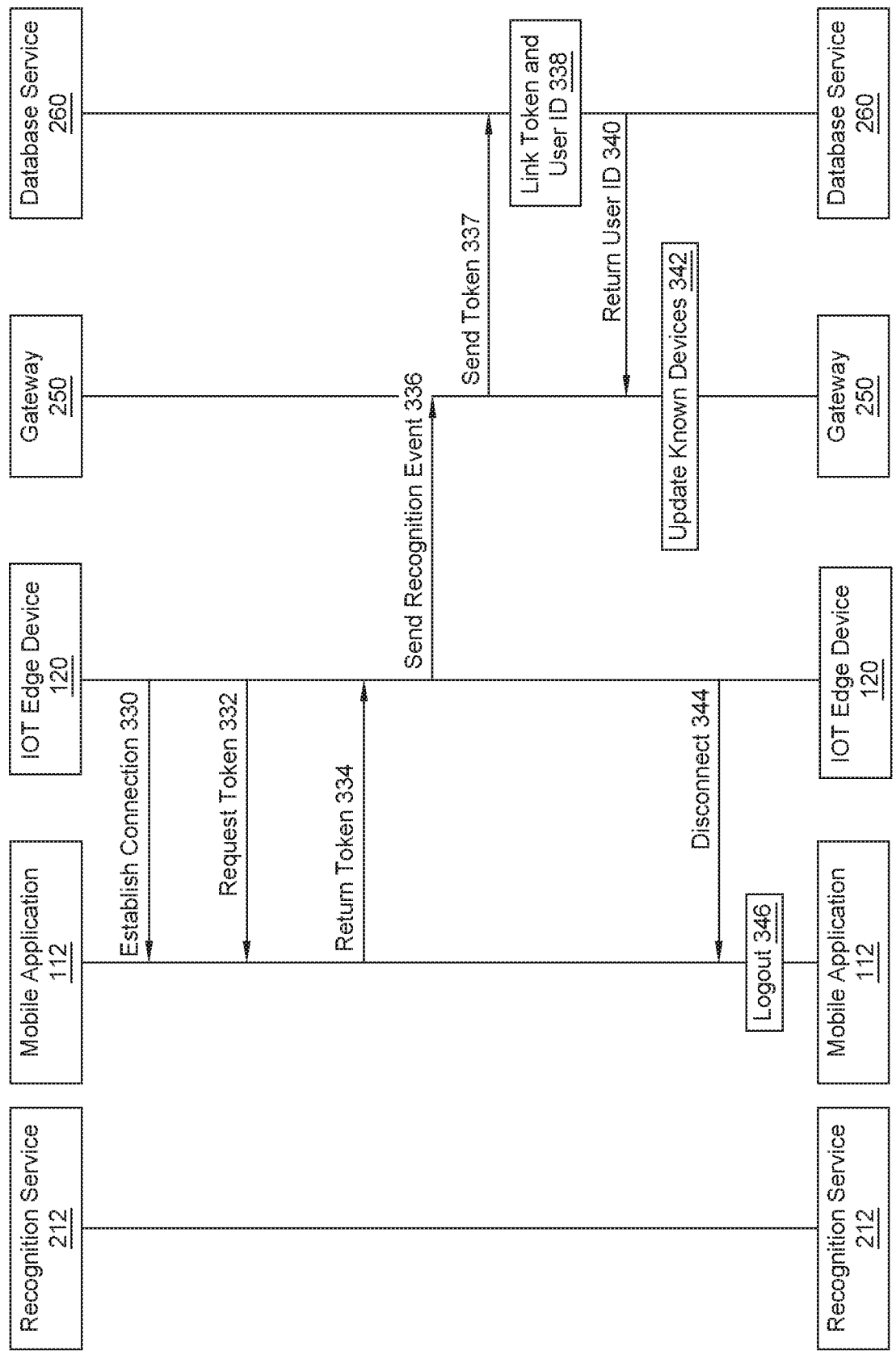

FIGS. 3A-B are process diagrams for secure recognition of mobile devices, according to one embodiment. Starting with FIG. 3A, at block 302 a user installs a mobile application 112 on their mobile device (e.g., the mobile device 110 illustrated in FIG. 1), and logs in to the mobile application 112. In an embodiment, the user logs in with a username and password. Alternatively, any other suitable authentication system can be used (e.g., fingerprint recognition, facial recognition, other biometric recognition, etc.).

In an embodiment, as part of the installation at block 302 the user affirmatively authorizes recognition of the mobile device by the trusted system. For example, the user can be asked to provide permission (e.g., using a pop-up, check box, or other suitable user interface component) for secure recognition. Alternatively, or in addition, the user authorizes recognition of the mobile device as part of downloading and installing the mobile application on the mobile device, or as part of signing up for a central account. In an embodiment, the secure recognition techniques illustrated in FIGS. 3A-B, and 4-7, are used only with user permission.

At block 304, assuming the user has provided permission, the mobile application 112 transmits a network message to a recognition service 212 (e.g., a recognition service 212 running on a server 200, as illustrated in FIGS. 1-2) to request tokens. In an embodiment, the mobile application 112 determines whether it already has tokens in local storage, and if so the mobile application deletes the old tokens. In an embodiment, the mobile application 112 transmits the message to the recognition service 212 over the internet or any other suitable communication network, using a cellular connection, Wi-Fi, or any other suitable wireless connection.

At block 306, the recognition service 212 generates tokens. In an embodiment, the recognition service 212 generates multiple tokens by combining various token components (e.g., a token identifier combined with an incremental counter) and using format preserving encryption to generate encrypted tokens meeting bit constraints. This is discussed in more detail with regard to FIG. 6, below.

At block 308, the recognition service 212 transmits the generated tokens to the mobile application 112 using a network message. The recognition service 212 can transmit the message to the mobile application 112 over the internet or any other suitable communication network, using a cellular connection, Wi-Fi, or any other suitable wireless connection.

At block 309, the mobile application 112 stores the received tokens locally (i.e., in local storage). Alternatively, or in addition, the mobile application 112 can store the received tokens in a remote location accessible to the mobile device over a secure connection. For example, the mobile application 112 can store the received tokens in a suitable secure cloud location, on an associated device (e.g., a watch or other wearable device could store the tokens on an associated smartphone or tablet), or in any other secure location.

In an embodiment, the tokens are valid for a period of time (e.g., 24 hours) after which the tokens expire and the mobile application deletes the tokens. Alternatively, or in addition, the tokens are valid until used (or until used an allowed number of times). For example, each token could be valid for a maximum of 24 hours, or until used, whichever occurs first. In an embodiment, the pool of tokens on the mobile application is refreshed periodically when the mobile application has a network connection. This can be done, for example, by repeating blocks 304, 306, 308, and 309, to request and retrieve a new pool of tokens. This can help to ensure that the mobile application does not run out of tokens (e.g., if each token may only be used once).

At block 310, the recognition service 212 associates the tokens with a user identifier using the database service 260. As one example, the logged in user can be associated with a user identifier on the server (e.g., the server 200 illustrated in FIGS. 1-2). The recognition service 212 can transmit a network message (e.g., using a suitable application programming interface (API) or protocol) to the database service 260 providing the user identifier and the associated tokens. The database service 260 can then store an association between the user identifier and the associated tokens in a database (e.g., the database 262 illustrated in FIG. 1). As discussed above in relation to FIG. 1, in one embodiment the database service 260 and the recognition service 212 are separate. Alternatively, the database service 260 and the recognition service 212 are combined. In this embodiment, at block 310 the combined recognition service 212 and database service 260 stores the association between the user identifier and the associated tokens.

At block 312, an IOT edge device 120 (e.g., one of the IOT edge devices 120A-N illustrated in FIG. 1) transmits a wakeup message to the mobile application 112. The mobile application 112 can include a wakeup function, with which the mobile application 112 will wake up in response to the wakeup message. In an embodiment, the wakeup message is a BLE wakeup advertisement. Alternatively, any other suitable wakeup message (e.g., a beacon) can be used.

In an embodiment, the IOT edge device 120 continuously transmits wakeup messages to mobile device in range of the IOT edge device. For example, the IOT edge device 120 can transmit a wakeup message repeatedly at given intervals (e.g., every few seconds, milliseconds, or minutes). In an embodiment, this wakeup message causes the mobile application 112 to continuously run in the background of the respective mobile device. This is merely one example. Alternatively, the mobile application 112 could be continuously running in the background, at all times, and a wakeup message would not be necessary. As another alternative, or in addition to using a wakeup message, the mobile application 112 could be configured to wake itself up periodically (e.g., every few seconds or minutes).

A flow 326, made up of blocks 314 through 324, then runs repeatedly. In an embodiment, the IOT edge device 120 maintains a list of known mobile devices. At block 314, a gateway 250 (e.g., the gateway 250 illustrated in FIG. 1) updates this list of known devices on the IOT edge device 120. In an embodiment, this list of known devices is maintained by the recognition service 212 and provided to the gateway 250.

At block 316, the IOT edge device 120 scans for devices. In an embodiment, the IOT edge device 120 scans for messages likely to be from mobile devices that can be recognized. For example, the IOT edge device 120 can scan for BLE advertisements on designated BLE channels. Further, the IOT edge device 120 can evaluate received messages based on various criteria suggesting that the message is an advertisement from a user device. For example, the IOT edge device 120 can evaluate the incoming message for length, manufacturer characteristics, etc. In this way, the IOT edge device 120 can differentiate likely recognition messages from other network messages.

At block 318, the mobile application 112 transmits an advertisement message to the IOT edge device 120. In an embodiment, the advertisement is a BLE advertisement. In this embodiment, the mobile application can advertise as a BLE peripheral with a characteristic having a Universal Unique ID (UUID) Characteristic ID (CID). Alternatively, any suitable message can be used. In an embodiment, the mobile application 112 repeatedly (e.g., at intervals) transmits the background advertisement to any IOT edge devices in range.

At block 320, the IOT edge device 120 receives the advertisement from the mobile application 112 and checks the known devices list. In an embodiment, the IOT edge device 120 can collect and maintain (itself or using another network component) information about the received advertisement. For example, the IOT edge device 120 can collect the received signal strength, the time received, and the MAC address of the transmitting device.

The MAC address (or another suitable identifier) can be used to determine whether the mobile application 112 is running on a known mobile device. For example, the known devices list maintained at the IOT edge device 120 can include a whitelist of known MAC addresses for known mobile devices. In an embodiment, the mobile device may periodically change its MAC address (e.g., every 15 minutes), and so the known device list may only be valid for period of time. At block 322, if the advertisement is from a mobile device on the known devices list, the IOT edge device 120 transmits a recognition event to the gateway. In an embodiment, this recognition event signals that the mobile application 112 has been recognized by the IOT edge device 120 and triggers any improved user experience for the mobile device on which the mobile application 112 is running.

At block 324, if the advertisement is from a mobile device that is not on the known devices list, the IOT edge device 120 queues the advertisement for recognition (e.g., while the IOT edge device 120 attempts to recognize the mobile device). This is discussed further with regard to FIG. 3B, below.

In an embodiment, the IOT edge device 120 can share its list of known devices (e.g., a whitelist) with other IOT edge devices. For example, when the IOT edge device 120 recognizes a device and adds the device to its list of known devices, the IOT edge device 120 can transmit a network message to other IOT edge devices within range with the recognized device information. The recipient IOT edge devices can then update their list of known devices. In an embodiment, sharing the list of known devices can improve performance by allowing neighboring IOT edge devices to recognize the mobile device without retrieving a token from the mobile device or following the process outlined in FIG. 3B.

In an embodiment, this is an optional feature that can be enabled or disabled. Alternatively, this feature can be enabled or disabled based on network conditions or metrics. For example, if recognition becomes delayed or IOT edge devices become busy with the recognition process, sharing of known devices can become automatically enabled (e.g., using the recognition service 212 or another central service). As another alternative, the list of known devices can be maintained in a location accessible by multiple IOT edge devices 120 (e.g., on the recognition service 212) and can be shared among the IOT edge devices.

Moving to FIG. 3B, the queued recognition events at the IOT edge device are processed. In an embodiment, FIG. 3B is a continuation of the process diagram for secure recognition of mobile devices started in FIG. 3A. At block 330 the IOT edge device 120 establishes a connection with the mobile application 112 (e.g., a BLE connection or any other suitable wireless connection).

At block 332, the IOT edge device 120 transmits a token request to the mobile device running the mobile application 112. This token request requests a token from the mobile application 112. In an embodiment, the IOT edge device 120 does this by attempting to read a BLE characteristic related to the token, from the mobile application to the IOT edge device 120. Alternatively, another suitable network protocol or message can be used by the IOT edge device 120 to request the token from the mobile application 112.

Assuming the mobile application 112 recognizes the request and has a token, at block 334 the mobile application 112 returns a token to the IOT edge device 120. In an embodiment, the token is transmitted using BLE. For example, the token can be provided from the mobile application 112 to the IOT edge device 120 in a BLE characteristic. In this example, the token can be provided using a set BLE characteristic. This characteristic need not be kept secret, because the token itself ensures the security of the recognition techniques. In an embodiment, the mobile application 112 selects the token randomly, from among the pool of available tokens. Alternatively, the mobile application 112 can select the token sequentially, or on a rotating basis.

In an embodiment, a BLE characteristic has a maximum number of bits (e.g., 128 bits). As discussed further with regard to FIG. 6, below, the token can be generated to occupy a predetermined number of bits. For example, the token can be generated to occupy, at most, the maximum allowed number of bits so that it can be provided in a BLE characteristic. This is merely one example, and any suitable transport mechanism can be used (e.g., another type of BLE message or another wireless transmission protocol can be used).

At block 336, the IOT edge device 120 sends a recognition event to the gateway 250. In an embodiment, the recognition event includes the token received from the mobile application 112. At block 337, the gateway 250 sends the token to the database service 260. At block 338, the database service 260 links the token with its associated user ID (e.g., using a database 262 as discussed in relation to FIG. 1). This is discussed further with regard to FIG. 7, below.

At block 340, the database service 260 returns the user id to the gateway 250. At block 342, the gateway 250 updates the known device list based on the user ID. For example, the gateway 250 updates a whitelist linking a MAC address (e.g., received as part of the recognition event at block 336) with the user ID. The gateway 250 then updates the list of known devices at the IOT edge device 120 through the normal repeated process (e.g., as discussed in relation to block 314 in FIG. 3A). At block 344, the IOT edge device transmits a disconnect message to the mobile application 112 (e.g., closing the connection established at block 330). In an embodiment, this is a BLE disconnect message. Alternatively, another suitable network protocol or message can be used.

At block 346, the mobile application logs out of the central system. In one embodiment, the user affirmatively instructs the mobile application to log out (e.g., by selecting an appropriate portion of a user interface in the mobile application). Alternatively, or in addition, the mobile application logs out after it has been idle for a period of time. This period of time can be customized or selected by a user, can be set by default in the mobile application, or both. In an embodiment, after a user logs out of the central system all tokens stored for the mobile application 112 are deleted.

As illustrated in FIGS. 1 and 3A and 3B, the server-side system includes the IOT edge device 120, the recognition service 212, the gateway 250, and the database service 260. In one embodiment, these separate components are used for secure recognition of mobile devices. Alternatively, one or more of these components can be combined into a single system, or additional components can be used. For example, the IOT edge device 120 can be combined with the gateway 250, and the actions performed by each device can instead be performed by the combined device (e.g., interacting with the recognition service 212 and the database service 260). As another example, the gateway 250 can be combined with the recognition service 212 and/or the database service 260. Other combinations will be understood by persons of ordinary skill.

Figure 4:
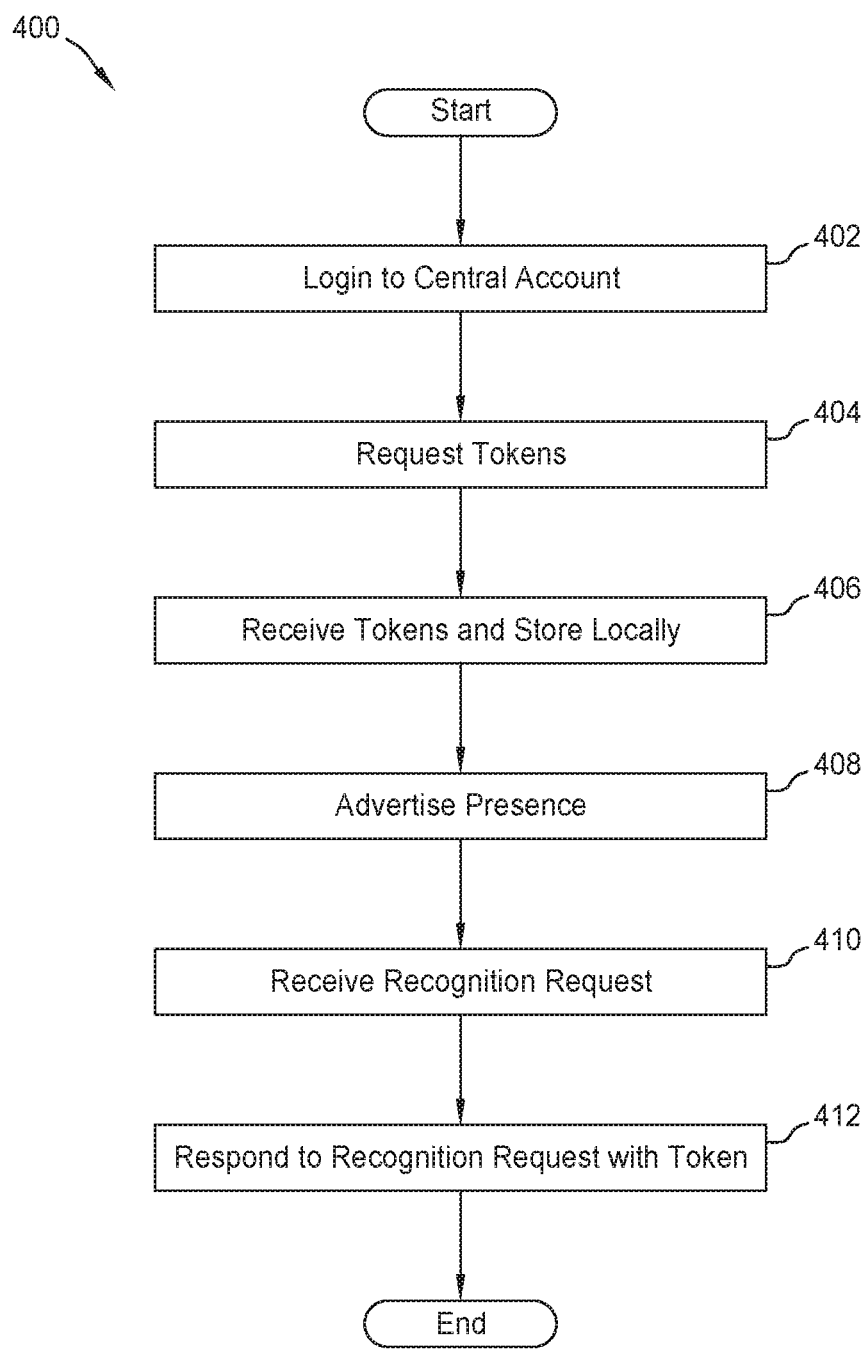
FIG. 4 is a flowchart illustrating a mobile device process for secure recognition of mobile devices, according to one embodiment.

FIG. 4 is a flowchart 400 illustrating a mobile device process for secure recognition of mobile devices, according to one embodiment. At block 402 a user uses a mobile application (e.g., the mobile application 112 illustrated in FIG. 1) on a mobile device (e.g., the mobile device 110 illustrated in FIG. 1) to log in to a central account. For example, the mobile application can use a suitable authentication technique (e.g., a username and password, biometric identification, etc.) to log in to the central account. In an embodiment, as part of logging in to the central account the user expressly authorizes recognition of the mobile device as the user moves through the trusted system (e.g., the sports arena as discussed in FIG. 1). Alternatively, or in addition, the user authorizes recognition of the mobile device as part of downloading and installing the mobile application on the mobile device, or as part of signing up for a central account.

At block 404, the mobile application requests tokens from a service (e.g., from a recognition service, as illustrated at block 304 in FIG. 3A) over a communication network (e.g., over the internet, using a suitable wireless network protocol). In an embodiment, this is an HTTPS request that includes a device identifier for the mobile device (e.g., a BLE MAC address) and account information for the user (e.g., kept by the mobile application). Alternatively, a different message format and type can be used.

At block 406, the mobile application receives tokens from the service (e.g., from the recognition service as illustrated at block 308 in FIG. 3A) and stores the tokens locally. As discussed in relation to block 309 in FIG. 2, the mobile application can store the received tokens locally (i.e., in local storage) at the mobile device. Alternatively, or in addition, the mobile application can store the received tokens in a remote location accessible to the mobile device over a secure connection. For example, the mobile application can store the received tokens in a suitable secure cloud location, on an associated device (e.g., a watch or other wearable device could store the tokens on an associated smartphone or tablet), or in any other secure location.

At block 408, the mobile application advertises its presence by transmitting network advertising messages. This is discussed in relation to block 318 in FIG. 3A. For example, in an embodiment, the mobile application can use BLE to transmit BLE advertising messages to IOT edge devices (e.g., IOT edge devices 120 illustrated in FIGS. 1-3). Alternatively, any other suitable network protocol or message can be used.

At block 410, the mobile application receives a recognition request from an IOT edge device (e.g., an IOT edge device 120 as illustrated in FIG. 1). For example, the IOT edge device can transmit a recognition request to the mobile application, after receiving the advertisement at block 408. The transmission of this recognition request by the IOT edge device is discussed further in relation to FIG. 5, below.

At block 412, the mobile application responds to the recognition request with a token (e.g., one of the tokens received at block 404). In an embodiment, at block 404 the mobile application receives a number of tokens to use in responding to recognition requests. Each time the mobile application receives a recognition request at block 410, the mobile application responds with a different token. In an embodiment, the mobile application randomly selects the token to transmit in response to the recognition request, from the stored collection of tokens. Alternatively, the stored collection of tokens are sequential and the mobile application responds with the next token in sequence. In one embodiment, each token is used only once by the mobile application to respond to the recognition request. Alternatively, the tokens could be re-used (e.g., after a period of time, based on a signal from a remote location, or for another reason).

In an embodiment, following block 412 the mobile device is recognized by the IOT edge device seamlessly, without requiring user interaction. As noted above, the user can expressly permit recognition when downloading the mobile application or logging in to the central account. The user can then seamlessly take advantage of the features offered by recognition, without further interaction. Alternatively, the user can be prompted for further permission.

Figure 5:
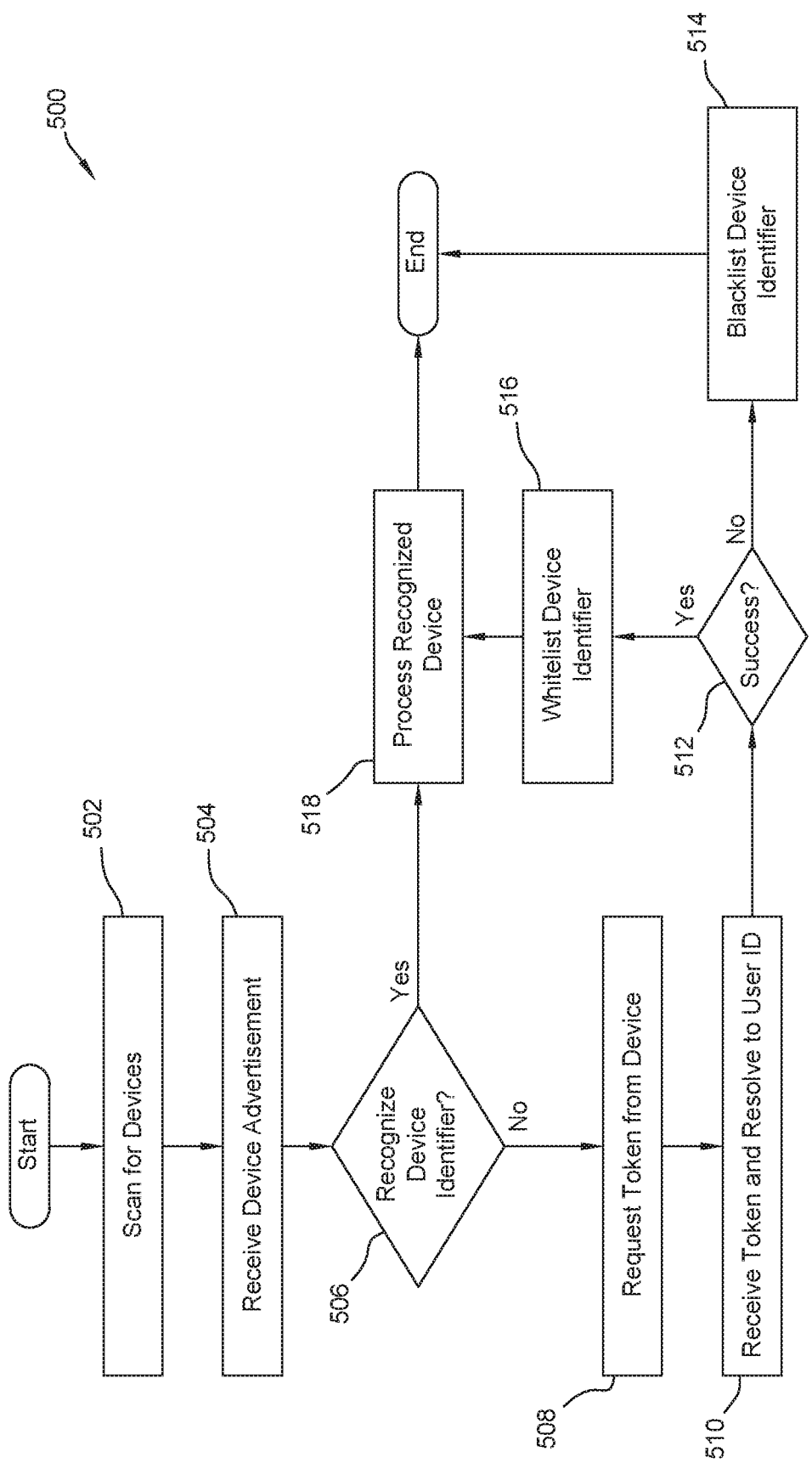
FIG. 5 is a flowchart illustrating an IOT edge device process for secure recognition of mobile devices, according to one embodiment.

FIG. 5 is a flowchart 500 illustrating an IOT edge device process for secure recognition of mobile devices, according to one embodiment. At block 502, an IOT edge device (e.g., one of the IOT edge devices 120A-N illustrated in FIG. 1) scans for devices within range of the IOT edge device (e.g., mobile devices). In an embodiment, this corresponds to block 316 illustrated in FIG. 3A. For example, the IOT edge device can perform a continuous BLE scan for advertisements from devices within range of the IOT edge device, by listening on designated channels (e.g., designated BLE advertisement channels) for advertising packets from the devices. This is merely one example, and any suitable communication protocol or interface can be used.

At block 504, the IOT edge device receives an advertisement from a device. In an embodiment, this corresponds with block 318 illustrated in FIG. 3A. For example, during the scanning of block 502 the IOT edge device can receive an advertisement (e.g., a BLE advertising packet transmitted by a device over an advertisement channel) corresponding to a mobile device within range of the IOT edge device.

At block 506, the IOT edge device determines whether it recognizes a device identifier associated with the received advertisement. In an embodiment, the advertisement received at block 504 includes an identifier associated with the transmitting mobile device. For example, a BLE advertisement can include a BLE MAC address associated with the transmitting device. This is merely one example, and any suitable device identifier can be used.

In an embodiment, the IOT edge device can include both a whitelist of previously recognized device identifiers and a blacklist of previously received un-recognized device identifiers. As discussed below in connection with block 514, a repeatedly un-recognized device identifier can be added to a blacklist to avoid continually attempting to recognize the device (e.g., a device that does not include tokens or suitable software code for recognition, or that has not permitted recognition). As discussed below in connection with block 516, an authorized device identifier can be added to a whitelist with a corresponding user identifier, to allow processing of the recognized device without repeatedly attempting to recognize the device (e.g., without repeatedly undertaking blocks 508-512, discussed below).

If the IOT edge device recognizes the device identifier, the flow proceeds to block 518. At block 518, the IOT edge device processes the recognized device. If the device is blacklisted, this processing ends with no further action.

If the device is whitelisted, the recognized device is processed to improve the user experience. For example, as illustrated in connection with block 322 in FIG. 3A, the IOT edge device can transmit a recognition event to a gateway server (e.g., gateway 250 illustrated in FIG. 1). The gateway server can use this recognition event to process the recognition of the device. In an embodiment, the IOT edge device can transmit the characteristics collected with the mobile application advertisement (e.g., the signal strength, time, and MAC address) to the gateway server.

For example, the gateway server can trigger a wide variety of recognition tasks to improve the user experience for the user operating the recognized mobile device. These can include a variety of events to improve the user experience. As one example, statistics about the user environment can be collected (e.g., transaction times for purchases, transit times between locations, wait times in lines, etc.). These statistics can be used to improve the user experience by, for example, increasing staffing in heavily trafficked areas, moving staff from lower trafficked areas to higher trafficked areas, identifying inefficient environmental design, etc.

As another example, processing the recognized device can be used to customize the user experience. For example, a user at a sporting event could identify a favorite player or team, and when passing a particular area in the environment, content relating to that player or team could be presented to the player (e.g., a video experience, an interactive application, an audio experience, etc.). As another example, a photo or video taken in the environment could be associated with the user, based on recognizing the user's device.

As another example, an experience provided at the event could be customized based on the user's experience or skill level. For example, at a sporting event (e.g., a baseball game) an interactive experience (e.g., a batting cage or pitching simulation) could be customized based on the user's baseball experience, skill level, or previous history with the interactive experience. Similarly, a user's previously entered preferences for the interactive experience could be recognized (e.g., a user could choose to throw left-handed or right-handed, etc.).

As discussed above, in one embodiment the IOT edge device (e.g., one or more of the IOT edge devices 120A-N illustrated in FIG. 1) processes the recognized device. Alternatively, another device can process the recognized device. For example, the IOT edge device can merely act as a conduit and the gateway (e.g., the gateway 250 illustrated in FIG. 1) or the recognition service (e.g., the recognition service 212 illustrated in FIGS. 1-2) can process the recognized device. As another alternative, the IOT edge device can itself include the functionality of the gateway, the recognition service, or both, and the combined device can process the recognized device.

If the IOT edge device does not recognize the device identifier, the flow proceeds to block 508. At block 508 the IOT edge device requests a token from the device. In an embodiment, this corresponds with block 332 illustrated in FIG. 3B. As discussed in relation to block 324 in FIG. 3A, in an embodiment a recognition event associated with the mobile device can be queued, for later processing.

At block 510, the IOT edge device receives a token from the device, and resolves the token to a user identifier. In an embodiment, this corresponds to blocks 334-340 illustrated in FIG. 3B. For example, the IOT edge device receives a token from the mobile device (e.g., transmitted from the mobile device to the IOT edge device as described in connection with block 412 illustrated in FIG. 4). This corresponds with block 334 illustrated in FIG. 3B. The IOT edge device then generates a recognition event, including the token, and transmits the recognition event to a gateway (e.g., a gateway 250 as illustrated in FIG. 1). This corresponds with block 336 illustrated in FIG. 3B.

The gateway parses the recognition event to identify the token, and transmits the token to a database service (e.g., the database service 260 illustrated in FIG. 1). This corresponds with block 337 illustrated in FIG. 3B. The database service identifies the user identifier that has previously been associated with the token (e.g., when the token was generated, as discussed below with regard to FIG. 6). This corresponds with block 338 illustrated in FIG. 3B. The database server then transmits the user identifier corresponding to the token back to the gateway. This corresponds with block 340 illustrated in FIG. 3B.

At block 512, the IOT edge device determines whether the token was successfully resolved to a user identifier. If not, the flow proceeds to block 514. At block 514, the IOT edge device blacklists the device identifier. As discussed above in relation to blocks 506 and 518, in an embodiment, the IOT edge device maintains a blacklist of device that have previously been recognized as unauthorized. At block 514, the IOT edge device adds the device identifier (e.g., received at block 504) to the blacklist. In an embodiment, the device identifier corresponding to a particular device changes over time (e.g., a BLE MAC address which typically rotates every 15 minutes), so that the blacklist is only enforced for a given device for the limited time period where the device is associated with the blacklisted identifier. Alternatively, the blacklist itself can operate for a limited period for each device, so that after a given period of time a device identifier is removed from the blacklist. Further, in an embodiment, if the IOT edge device does not receive a token from the device (e.g., at block 510), the device identifier can be added to the blacklist.

Returning to block 512, if the IOT edge device determines that resolving the token to a user identifier is successful, the flow proceeds to block 516. At block 516, the IOT edge device whitelists the device identifier. In an embodiment, the IOT edge device adds the device identifier and corresponding user identifier (e.g., a characteristic ID corresponding to the user) to a whitelist. As discussed above in relation to block 506, the whitelist allows the IOT edge device to recognize devices that have previously been recognized, without completing the full recognition process (e.g., without completing blocks 508 and 510 illustrated in FIG. 5).

The flow then proceeds to block 518. As discussed above, processing the device includes improving the user experience for the device (e.g., by transmitting a recognition event from the IOT edge device to the gateway, as illustrated at block 322 in FIG. 3A). This can include numerous recognition tasks (e.g., events), as discussed above. The flow then ends.

While FIG. 5 illustrates the IOT edge device recognizing the device identifier (e.g., as illustrated in block 506), requesting a token from the device (e.g., at block 508), resolving the user identifier (e.g., at block 510), and adding entries to the whitelist (e.g., at block 516) and the blacklist (e.g., at block 514), one, or all, of these tasks can instead be carried out by another component (e.g., the gateway 250, the recognition service 212, the database service 260, or another suitable component).

Figure 6:
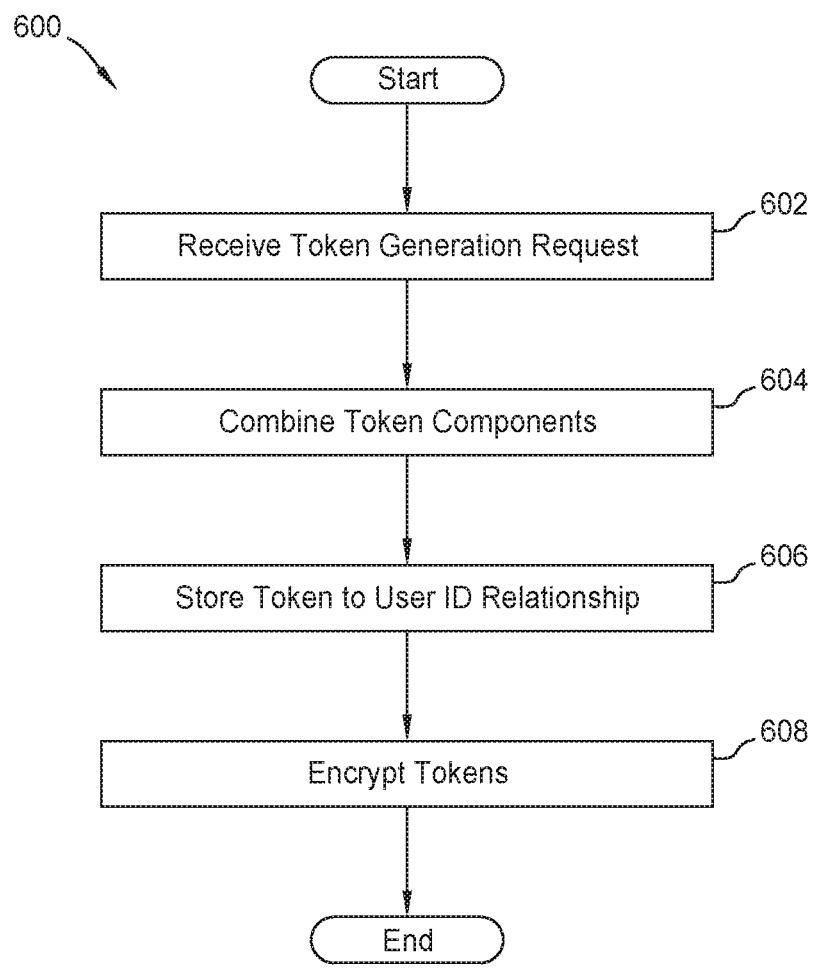
FIG. 6 is a flowchart illustrating a server process for generating tokens as part of secure recognition of mobile devices, according to one embodiment.

FIG. 6 is a flowchart 600 illustrating a server process for generating tokens as part of secure recognition of mobile devices, according to one embodiment. At block 602, a recognition service (e.g., the recognition service 212 illustrated in FIGS. 1 and 2), receives a request to generate tokens corresponding to a mobile device. In an embodiment, this corresponds with block 304 illustrated in FIG. 3A. For example, a mobile application (e.g., a mobile application 112 illustrated in FIGS. 1 and 2) requests tokens from the recognition service.

At block 604, the recognition service combines token components. In an embodiment, several tokens are generated corresponding to a requesting mobile device and mobile application. As one example, 128 tokens can be generated. Alternatively, any suitable number can be used.

In an embodiment, each token is a combination of a token identifier and a counter. As discussed below, with respect to block 608, this combination is encrypted on the server (e.g., using format preserving encryption). Thus, in one example, 128 tokens are generated for a requesting mobile application. Each token is a combination of the token identifier corresponding to the requesting mobile application (e.g., a number identifier) with one of the counter numbers (e.g., 0, 1, 2, 3, 4, up to 127). In an embodiment the token identifier can be a BLE CID, or another suitable identifier relating to the mobile application or the mobile device.

As discussed above with regard to block 334 in FIG. 3B, in an embodiment the token is allotted a maximum number of bits. For example, the token can be transported as a BLE characteristic, and therefore must be small enough to fit within the BLE characteristic parameters (e.g., maximum 128 bits). In this example, the recognition service combines components with a size such that the eventual encrypted token will meet the maximum size requirement. For example, assuming the encryption preserves the number of bits, the recognition service combines a token identifier and counter that, together, meet the maximum bit size requirement (e.g., maximum 128 bits combined).

At block 606, the recognition service stores the token to user identifier relationship. In an embodiment, this corresponds with block 310 illustrated in FIG. 3A. For example, the recognition service can transmit to a database service (e.g., the database service 260 illustrated in FIG. 3A) the token identifier encoded in the token along with a user identifier corresponding to the user. The database service can then store a correlation between the token identifier and the user identifier. This can later be used as a lookup table to retrieve the user identifier corresponding with a given token identifier. Alternatively, the recognition service can transmit to the database service the token identifier and an identifier corresponding to the mobile application, and the database service (or another suitable component) can determine the user identifier corresponding to the mobile application.

In one embodiment, as discussed above, each token includes a token identifier which, when decrypted, can be used to correlate the token with the user identifier. Alternatively, the token identifier can be the user identifier itself (or a value that can, itself, be used to determine the user identifier). In this way, the decrypted token identifier itself identifies the user for the recognition service, without needing to retrieve a correlation using the database service.

At block 608, the recognition service encrypts the tokens. As discussed above, in an embodiment, each token is a combination of a token identifier and a counter. This value can be encrypted by the recognition service, using a suitable form of encryption that can only later be decrypted using the recognition service (or another authorized component in the recognition system). In an embodiment, format preserving encryption can be used. For example, a secret key known only to the recognition service can be used to encrypt each token. The token can then only be decrypted by the recognition service, and only tokens generated by the recognition service will be identified as authorized.

As discussed above with regard to block 604, in an embodiment each token may occupy a maximum number of bits (e.g., to allow transport as a BLE characteristic). In one embodiment, as discussed above, the token components are chosen and created so that the token occupies the allotted number of bits. Alternatively, the encryption techniques (e.g., the format preserving encryption techniques) can generate an encrypted token that occupies the allotted number of bits, even if the underlying un-encrypted token value does not. For example, the encryption techniques can expand, or contract, the number of bits occupied by the underlying un-encrypted token.

Figure 7:
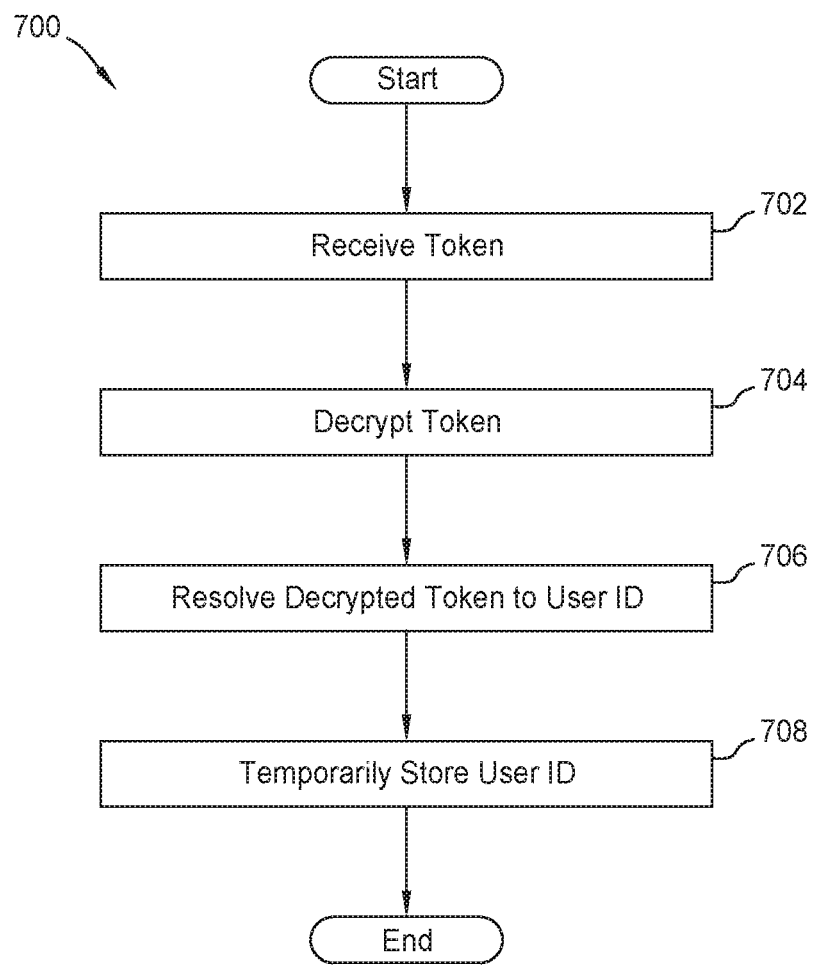
FIG. 7 is a flowchart illustrating a sever process for resolving tokens as part of secure recognition of mobile devices, according to one embodiment.

FIG. 7 is a flowchart 700 illustrating a sever process for resolving tokens as part of secure recognition of mobile devices, according to one embodiment. At block 702, a database service (e.g., the database service 260 illustrated in FIG. 1) receives a token. For example, as illustrated at blocks 336 and 337, in FIG. 3B, an IOT edge device 120 can receive a token from a mobile application 112, and can forward the token to a gateway 250. The gateway 250 can then send the token to the database service 260. In one embodiment, the database service receives the token at block 702 and resolves the token. Alternatively, a recognition service (e.g., recognition service 212 illustrated in FIGS. 1-2) receives the token. Further, as discussed above, the database service and recognition service can be combined.

At block 704, the service (e.g., database service, recognition service, or combined service) decrypts the token. As discussed above in connection with block 608 in FIG. 6, the token can be generated by encrypting an underlying value using a secret key known only to the trusted server system. In an embodiment, this same secret key is used to decrypt the token and recover the underlying value. If the secret key is not able to decrypt the token, or the underlying value does not meet the criteria for a properly generated token, the service can indicate an error and discard the token. Further, the service can log the error, which may indicate the presence of a non-trusted third party, and can provide an alert or indicator to a system administrator.

At block 706, the service resolves the decrypted token to a user identifier. For example, as discussed above, the decrypted token can include a token identifier. A database (e.g., the database 262 illustrated in FIG. 1) can store a correlation between the token identifier and a user identifier corresponding to the user of the mobile device. The database service can thus retrieve the user identifier, based on the token identifier, using the database. Alternatively, the token identifier can, itself, be a user identifier, or can be used to directly identify the user identifier (e.g., through a hash process).

At block 708, the service temporarily stores the user identifier. In an embodiment, the service can temporarily store the token identifier to user identifier correlation. This can act as a cache, so that subsequent requests received within a short period of time can be resolved without querying the database service.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for secure mobile device recognition, comprising:
   determining, based on a network message received at a first IOT edge device, that a mobile device is not recognized at the first IOT edge device;
   transmitting a token request from the first IOT edge device to the mobile device, and in response receiving at the first IOT edge device a first encrypted token from the mobile device, wherein the first encrypted token is one of a plurality of tokens received at the mobile device from a server different from the first IOT edge device;
   transmitting the first encrypted token from the first IOT edge device to the server, wherein the server is configured to determine an identifier corresponding with the mobile device, based on the first encrypted token;
   initiating a recognition task for the mobile device, based on the determined identifier;
   determining, based on a second network message received at a second IOT edge device different from the first IOT edge device, that the mobile device is not recognized at the second IOT edge device;
   transmitting a second token request from the second IOT edge device to the mobile device, and in response receiving at the second IOT edge device a second encrypted token from the mobile device, wherein the second encrypted token is different from the first encrypted token and is another of the plurality of tokens received at the mobile device from the server;
   transmitting the second encrypted token from the second IOT edge device to the server, wherein the server is configured to determine the identifier corresponding with the mobile device, based on the second encrypted token; and
   initiating a second recognition task for the mobile device, based on the determined identifier.

2. The method of claim 1, further comprising:
   receiving, at the server, a request to generate the plurality of tokens corresponding to the mobile device;
   generating the plurality of tokens, comprising the first encrypted token and the second encrypted token, at the server;
   storing, using the server, a correlation between the plurality of tokens and the identifier corresponding with the mobile device; and
   transmitting the plurality of tokens from the server to the mobile device.

3. The method of claim 2, wherein generating the plurality of tokens further comprises:
   generating the first encrypted token by encrypting a value using format preserving encryption, wherein the format preserving encryption generates a predetermined number of bits.

4. The method of claim 3, wherein the predetermined number of bits corresponds to a number of bits associated with a Bluetooth Low Energy (BLE) characteristic.

5. The method of claim 3, wherein the value comprises a token identifier and a counter.

6. The method of claim 1, wherein determining, based on the first encrypted token, the identifier corresponding with the mobile device further comprises:
   receiving, at the server, a request to determine the identifier, the request comprising the first encrypted token;
   identifying, using the server, a previously stored correlation between the first encrypted token and the identifier corresponding with the mobile device; and
   determining, using the server, the identifier corresponding with the mobile device based on the previously stored correlation.

7. The method of claim 6, wherein identifying the previously stored correlation further comprises:
   decrypting the first encrypted token, at the server, using a secret key;
   determining a token identifier based on the decrypted first encrypted token; and
   identifying the previously stored correlation using the token identifier.

8. The method of claim 7, wherein identifying the previously stored correlation comprises querying a database, using the token identifier, for the identifier corresponding with the mobile device.

9. The method of claim 1, wherein the first IOT edge device comprises a BLE reader.

10. The method of claim 1, wherein the first IOT edge device maintains a whitelist of previously recognized mobile devices, and wherein the determining that the mobile device is not recognized comprises determining that the mobile device is not included in the whitelist.

11. A non-transitory computer-readable medium containing computer program code that, when executed by operation of one or more computer processors, performs an operation comprising:
   determining, based on a network message received at a first IOT edge device, that a mobile device is not recognized at the first IOT edge device;
   transmitting a token request from the first IOT edge device to the mobile device, and in response receiving at the first IOT edge device a first encrypted token from the mobile device, wherein the first encrypted token is one of a plurality of tokens received at the mobile device from a server different from the first IOT edge device;
   transmitting the first encrypted token from the first IOT edge device to the server, wherein the server is configured to determine an identifier corresponding with the mobile device, based on the first encrypted token;
   initiating a recognition task for the mobile device, based on the determined identifier;
   determining, based on a second network message received at a second IOT edge device different from the first IOT edge device, that the mobile device is not recognized at the second IOT edge device;
   transmitting a second token request from the second IOT edge device to the mobile device, and in response receiving at the second IOT edge device a second encrypted token from the mobile device, wherein the second encrypted token is different from the first encrypted token and is another of the plurality of tokens received at the mobile device from the server;

transmitting the second encrypted token from the second IOT edge device to the server, wherein the server is configured to determine the identifier corresponding with the mobile device, based on the second encrypted token; and initiating a second recognition task for the mobile device, based on the determined identifier.

12. The non-transitory computer-readable medium of claim 11, the operation further comprising:

receiving, at the server, a request to generate the plurality of tokens corresponding to the mobile device;

generating the plurality of tokens, comprising the first encrypted token and the second encrypted token, at the server, comprising:

generating the first encrypted token by encrypting a value using format preserving encryption, wherein the format preserving encryption generates a predetermined number of bits;

storing, using the server, a correlation between the plurality of tokens and the identifier corresponding with the mobile device; and transmitting the plurality of tokens from the server to the mobile device.

13. The non-transitory computer-readable medium of claim 11, wherein determining, based on the first encrypted token, the identifier corresponding with the mobile device further comprises:

receiving, at the server, a request to determine the identifier, the request comprising the first encrypted token;

identifying, using the server, a previously stored correlation between the first encrypted token and the identifier corresponding with the mobile device; and determining, using the server, the identifier corresponding with the mobile device based on the previously stored correlation.

14. The non-transitory computer-readable medium of claim 13, wherein identifying the previously stored correlation further comprises:

decrypting the first encrypted token, at the server, using a secret key;

determining a token identifier based on the decrypted first encrypted token; and identifying the previously stored correlation using the token identifier.

15. A system, comprising:

a processor; and a memory containing a program that, when executed on the processor, performs an operation, the operation comprising:

determining, based on a network message received at a first IOT edge device, that a mobile device is not recognized at the first IOT edge device;

transmitting a token request from the first IOT edge device to the mobile device, and in response receiving at the first IOT edge device a first encrypted token from the mobile device, wherein the first encrypted token is one of a plurality of tokens received at the mobile device from a server different from the first IOT edge device;

transmitting the first encrypted token from the first IOT edge device to the server, wherein the server is configured to determine an identifier corresponding with the mobile device, based on the first encrypted token;

initiating a recognition task for the mobile device, based on the determined identifier;

determining, based on a second network message received at a second IOT edge device different from the first IOT edge device, that the mobile device is not recognized at the second IOT edge device;

transmitting a second token request from the second IOT edge device to the mobile device, and in response receiving at the second IOT edge device a second encrypted token from the mobile device, wherein the second encrypted token is different from the first encrypted token and is another of the plurality of tokens received at the mobile device from the server;

transmitting the second encrypted token from the second IOT edge device to the server, wherein the server is configured to determine the identifier corresponding with the mobile device, based on the second encrypted token; and initiating a second recognition task for the mobile device, based on the determined identifier.

16. The system of claim 15, the operation further comprising:

receiving, at the server, a request to generate the plurality of tokens corresponding to the mobile device;

generating the plurality of tokens, comprising the first encrypted token and the second encrypted token, at the server, comprising:

generating the first encrypted token by encrypting a value using format preserving encryption, wherein the format preserving encryption generates a predetermined number of bits;

storing, using the server, a correlation between the plurality of tokens and the identifier corresponding with the mobile device; and transmitting the plurality of tokens from the server to the mobile device.

17. The system of claim 15, wherein determining, based on the first encrypted token, the identifier corresponding with the mobile device further comprises:

receiving, at the server, a request to determine the identifier, the request comprising the first encrypted token;

identifying, using the server, a previously stored correlation between the first encrypted token and the identifier corresponding with the mobile device; and determining, using the server, the identifier corresponding with the mobile device based on the previously stored correlation.

* * * * *